(12) United States Patent
Lu et al.

(10) Patent No.: US 11,412,190 B2
(45) Date of Patent: Aug. 9, 2022

(54) IMAGE SENSOR WITH SUBTRACTIVE COLOR FILTER PATTERN

(71) Applicant: OMNIVISION TECHNOLOGIES, INC., Santa Clara, CA (US)

(72) Inventors: Chen-Wei Lu, San Jose, CA (US); Yin Qian, Milpitas, CA (US); Eiichi Funatsu, San Jose, CA (US); Jin Li, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 130 days.

(21) Appl. No.: 16/983,844

(22) Filed: Aug. 3, 2020

(65) Prior Publication Data
US 2022/0038664 A1   Feb. 3, 2022

(51) Int. Cl.
*H04N 9/083* (2006.01)
*H04N 9/04* (2006.01)
*H04N 11/20* (2006.01)

(52) U.S. Cl.
CPC ......... *H04N 9/04559* (2018.08); *H04N 11/20* (2013.01); *H04N 2209/045* (2013.01)

(58) Field of Classification Search
CPC ...... H04N 5/374; H04N 9/045; H04N 9/0455; H04N 9/04551; H04N 9/04555; H04N 9/04559; H04N 11/20; H04N 2209/045; H01L 27/14621; H01L 27/14627
See application file for complete search history.

(56) References Cited

U.S. PATENT DOCUMENTS

| | | | |
|---|---|---|---|
| 7,564,589 B2 | 7/2009 | Spaulding et al. | |
| 9,369,681 B1 | 6/2016 | Wu et al. | |
| 2010/0141812 A1* | 6/2010 | Hirota | H04N 9/04559 348/279 |
| 2016/0088265 A1* | 3/2016 | Lu | H01L 27/14627 348/280 |
| 2017/0201726 A1* | 7/2017 | Yorikado | H01L 27/14623 |
| 2018/0376076 A1* | 12/2018 | Park | H04N 13/239 |

OTHER PUBLICATIONS

"Andrew Zimmerman Jones, What is the Visible Light Spectrum?, Feb. 14, 2020, https://www.thoughtco.com, pp. 1-2" (Year: 2020).*

* cited by examiner

*Primary Examiner* — Kelly L Jerabek
(74) *Attorney, Agent, or Firm* — Christensen O'Connor Johnson Kindness PLLC

(57) ABSTRACT

An image sensor includes a photodiode array and a color filter array optically aligned with the photodiode array. The photodiode array includes a plurality of photodiodes disposed within respective portions of a semiconductor material. The color filter array includes a plurality of color filters arranged to form a plurality of tiled minimal repeating units. Each minimal repeating unit includes at least a first color filter with a red spectral photoresponse, a second color filter with a yellow spectral photoresponse, and a third color filter with a panchromatic spectral photoresponse.

19 Claims, 6 Drawing Sheets

IMAGE SENSOR WITH SUBTRACTIVE COLOR FILTER PATTERN

TECHNICAL FIELD

This disclosure relates generally to image sensors, and in particular but not exclusively, relates CMOS image sensors and applications thereof.

BACKGROUND INFORMATION

Image sensors have become ubiquitous and are now widely used in digital cameras, cellular phones, security cameras, as well as, medical, automobile, and other applications. As image sensors are integrated into a broader range of electronic devices it is desirable to enhance their functionality, performance metrics, and the like in as many ways as possible (e.g., resolution, power consumption, dynamic range, etc.) through both device architecture design as well as image processing.

The typical image sensor operates in response to image light reflected from an external scene being incident upon the image sensor. The image sensor includes an array of pixels having photosensitive elements (e.g., photodiodes) that absorb a portion of the incident image light and generate image charge upon absorption of the image light. The image charge of each of the pixels may be measured as an output voltage of each photosensitive element that varies as a function of the incident image light. In other words, the amount of image charge generated is proportional to the intensity of the image light, which is utilized to produce a digital image (e.g., image data) representing the external scene.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
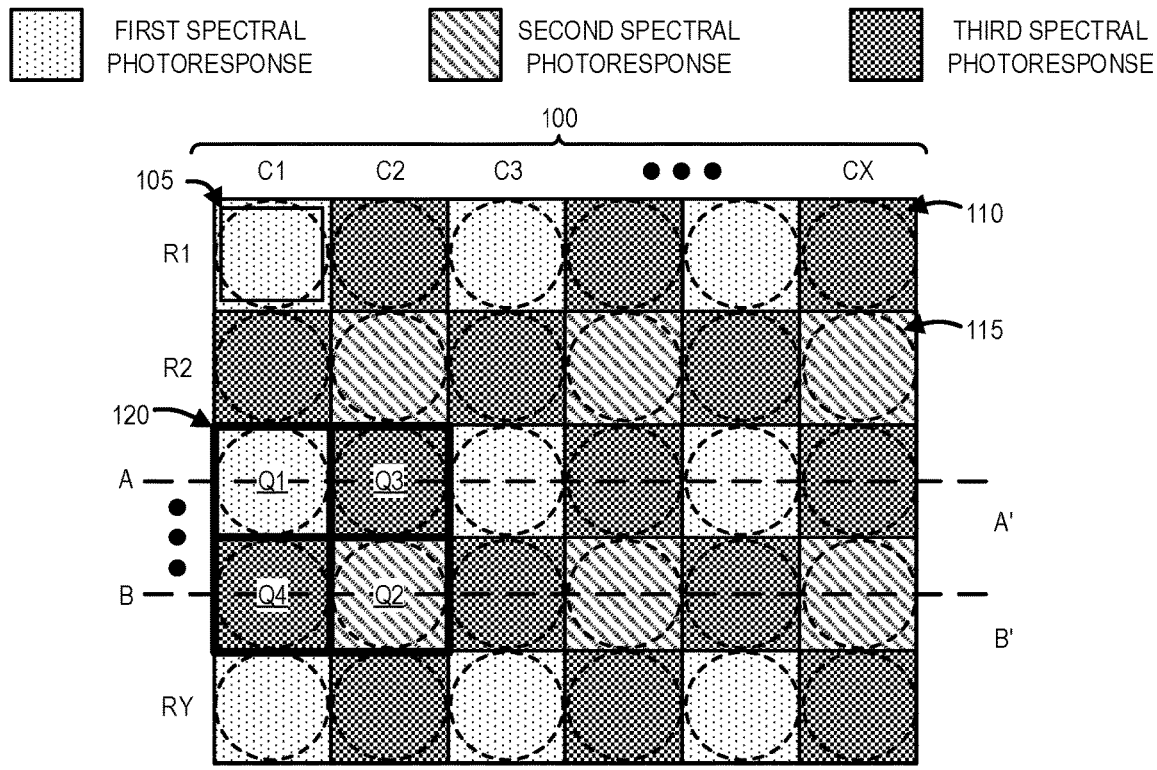
FIG. 1A illustrates a top view of an image sensor with subtractive color filter pattern, in accordance with the teachings of the present disclosure.

Embodiments of an apparatus, system, and method each including or otherwise related to an image sensor with a subtractive color filter pattern are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Embodiments described herein utilize, or are otherwise related to, an image sensor with a subtractive color filter pattern that provides improved low-light sensitivity, reduced cross-talk, and less color error when converting image signals from a subtractive color model of the image sensor (e.g., yellow, red, white color model) to an additive color model (e.g., red, green, blue color model). In some embodiments, the subtractive color filter array may include a plurality of color filters arranged to form a plurality of tiled minimal repeating units, each minimal repeating unit including at least a first color filter with a red spectral photoresponse, a second color filter with a yellow spectral photoresponse, and a third color filter with a panchromatic (e.g., white) spectral photoresponse. In the same or other embodiments, the minimal repeating unit may be arranged in a two-by-two color filter pattern and included a fourth color filter with a red, yellow, or panchromatic spectral photoresponse. In some embodiments, there is greater than a one-to-one correspondence between photodiodes and color filters included in the image sensor such that each individual color filter included in the minimal repeating unit is optically aligned with more than one of the photodiodes (e.g., each color filter may be optically aligned with, or otherwise extend over, a respective group of four photodiodes included in the image sensor).

Figure 1B:
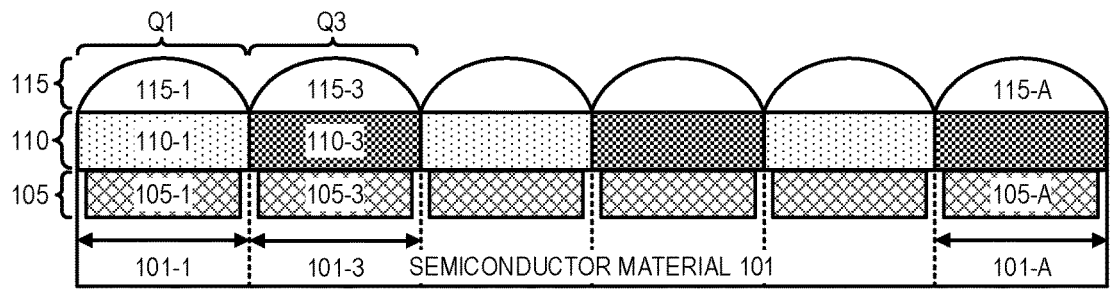
FIG. 1B illustrates a cross-sectional view of the image sensor illustrated in FIG. 1A along line A-A', in accordance with the teachings of the present disclosure.
Figure 1C:
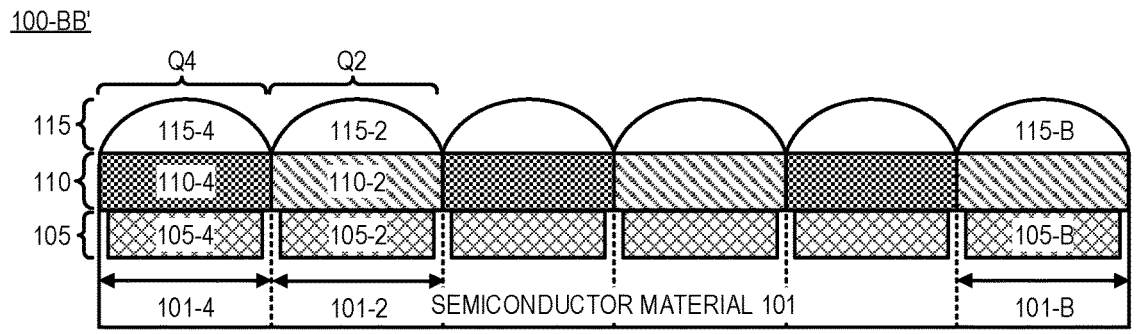
FIG. 1C illustrates a cross-sectional view of the image sensor illustrated in FIG. 1A along line B-B', in accordance with the teachings of the present disclosure.

FIGS. 1A-1C illustrate representative views of an image sensor 100 including a semiconductor material 101, a plurality of photodiodes 105, a plurality of color filters 110, and a plurality of microlenses 115. It is appreciated that the views presented in FIGS. 1A-1C may omit certain elements of the image sensor 100 to avoid obscuring details of the disclosure. It is further appreciated that in some embodiments, the image sensor 100 may not necessarily include all elements illustrated in FIGS. 1A-1C.

FIG. 1A illustrates a top view of an image sensor 100 with a subtractive color filter pattern, in accordance with the teachings of the present disclosure. As illustrated, the plurality of photodiodes 105, the plurality of color filters 110, and the plurality of microlenses 115 are arranged in regular, repeating manners to respectively form a photodiode array, a color filter array, and a microlens array that are optically aligned with one another. Collectively, the photodiode array, the color filter array, and the microlens array form an array of pixels of the image sensor 100 characterized by rows (e.g., R1, R2, RY) and columns (e.g., C1, C2, CX). Each pixel included in the array may include at least one of the photodiodes included in the plurality of photodiodes 105, at least one of the color filters included in the plurality of color filters 110, and at least one of the microlenses included in the plurality of microlenses 115. Accordingly, a given pixel and associated circuitry (e.g., readout circuitry such as a 3-transistor readout circuit, 4-transistor readout circuit, and the like) of the image sensor 100 is capable of generating an electrical signal (e.g., voltage) with a magnitude proportional to an intensity of incident light that is within a portion of the electromagnetic spectrum defined, at least in part, by the spectral photoresponse of the overlying color filter of the given pixel.

In the illustrated embodiment, the plurality of color filters 110 are arranged to form a plurality of minimal repeating units 120, each minimal repeating unit including a first color filter (e.g., the color filter associated with a first pixel corresponding to Q1), a second color filter (e.g., the color filter associated with the second pixel corresponding to Q2), and a third color filter (e.g., the color filter associated with the third pixel corresponding to Q3). Additionally, it is noted that each of the minimal repeating units of image sensor 100 further includes a fourth color filter (e.g., the color filter associated with the fourth pixel corresponding to quadrant Q4). More specifically, the first color filter has a first spectral photoresponse, the second color filter has a second spectral photoresponse, the third color filter has a third spectral photoresponse, and the fourth color filter has a fourth spectral photoresponse which collectively form a two-by-two color filter pattern that is representative of a full color image pixel of image sensor 100. As illustrated, the minimal repeating unit 120 includes a group of four abutting color filters (e.g., the first color filter of pixel Q1, the second color filter of pixel Q2, the third color filter of pixel Q3, and the fourth color filter of pixel Q4). In accordance with embodiments of the disclosure, the two-by-two color filter pattern is a subtractive color filter pattern in which the third spectral photoresponse is broader than the second spectral photoresponse and the second spectral photoresponse is broader than the first spectral photoresponse.

In some embodiments, the first spectral photoresponse of the first color filter within Q1 of minimal repeating unit 120 corresponds to a red spectral photoresponse (e.g., the first pixel associated with Q1 is a red color pixel), the second spectral photoresponse of the second color filter within Q2 of minimal repeating unit 120 corresponds to a yellow spectral photoresponse (e.g., the second pixel associated with Q2 is a yellow color pixel), and the third spectral photoresponse of the third color filter within Q3 of minimal repeating unit 120 corresponds to white or panchromatic spectral photoresponse (e.g., the third pixel associated with Q3 is a white, clear, or panchromatic color pixel). The terms "red," "yellow," and "white" generally refer to a portion of the electromagnetic spectrum that the corresponding color filter transmits to the underlying photodiode (e.g., a first frequency range of approximately 570 nm to 700 nm for red pixels, a second frequency range for approximately 450 nm to 700 nm for yellow pixels, and a third frequency range of approximately 400 nm to 700 nm for panchromatic pixels). It is appreciated that the term "approximately" may provide one or more margins of variance for the transmissive properties of individual color filters, which may be 1%, 5%, 10%, or otherwise. In some embodiments, any pixel with a quantum efficiency for a given frequency range greater than a threshold percentage (e.g., 40%) will be considered to employ a color filter that is transmissive of the given frequency range. For example, if a pixel has a quantum efficiency of greater than 40% throughout the frequency range associated with yellow (e.g., 450 nm to 700 nm), then the pixel will be considered a yellow pixel. Additionally, it is appreciated the spectral photoresponse of each of the color filters included in the plurality of color filters 110 are described in reference to visible range (e.g., 400 nm to 700 nm) of the electromagnetic spectrum, but that the transmissive range of individual color filters may extend outside of the visible range. In some embodiments, image sensor 100 may further include one or more cut-off filters that may reflect, absorb, or otherwise attenuate light outside of the visible range (e.g., greater than 700 nm or less than 400 nm in wavelength). In the same embodiment, the plurality of color filters 110 may be disposed between the one or more cut-off filters and the plurality of photodiodes 105.

In the illustrated embodiment, the fourth spectral photoresponse of the fourth color filter within Q4 of minimal repeating unit 120 corresponds to white or panchromatic and is substantially identical (e.g., same material composition or structure) as the third color filter within Q3. In other embodiments, the fourth spectral photoresponse of the fourth color filter within Q4 of minimal repeating unit 120 is substantially identical to the first color filter of Q1 or the second color filter of Q2. In other embodiments, the color filters of the minimal repeating unit 120 includes only three color filters (e.g., Q1, Q2, and Q3). It is appreciated that in the illustrated embodiments, each of the plurality of photodiodes 105 and plurality of color filters 110 are illustrated as having a square shape. However, in other embodiments the image sensor 100 may include other shapes or arrangements of the plurality of photodiodes 105, plurality of color filters 110, and/or plurality of microlenses 115. For example, individual photodiodes included in the plurality of photodiodes 105 and individual color filters included in the plurality of color filters 110 may be any shape such as circular, rectangular, hexagonal, octagonal, trapezoidal, ovoidal, or otherwise. It is further appreciated that the shape and/or position of the overlying plurality of microlenses 115 may further be changed or adjusted appropriately to focus incident light on the underlying photodiode.

The minimal repeating unit 120 of image sensor 100 is associated with a full color image pixel because electrical signals generated by individual color pixels (e.g., red, yellow, white, or otherwise) may be compared to cover the entire visible spectrum. For example, the electrical signals associated with the pixels of the minimal repeating unit 120 may be compared to one another when capturing an image to convert the YWR color spectrum information to an RGB color spectrum, which can subsequently be utilized for forming an image. In one embodiment, the electrical signal associated with a yellow pixel may be subtracted from the electrical signal associated with a white pixel to determine blue color information for the region defined, at least in part, by the position of the white pixel and yellow pixel on the image sensor 100. Similarly, the electrical signal associated with a red pixel may be subtracted from the electrical signal associated with the yellow pixel to determine green color information for the region defined, at least in part, by the position of the red pixel and the yellow pixel. Advantageously, by converting from the YWR spectrum to RGB spectrum, higher blue and green sensitivities may be achieved due to the larger blue and green integration areas from the converted YWR spectrum (see, e.g., FIG. 4), which additionally leads to lower crosstalk between green and blue color channels of the converted spectrum. Furthermore, it is appreciated that while full color information may be derivable based on an individual one of the minimal repeating units 120, this should not be deemed limiting. Rather, in some embodiments, electrical signals associated with more than one of the minimal repeating units may be grouped or otherwise processed together to generate full color information for one or more regions of the image sensor 100.

FIG. 1B illustrates a cross-sectional view 100-AA' of the image sensor 100 illustrated in FIG. 1A along line A-A', in accordance with the teachings of the present disclosure. As illustrated, the plurality of color filters 110 are disposed between the plurality of photodiodes disposed in respective portions (e.g., 101-1) of semiconductor material 101 (e.g., silicon) and the plurality of microlenses 115 for a given pixel. For example, first pixel Q1 is a red pixel and includes photodiode 105-1 disposed in portion 101-1 of semiconductor material 101, first color filter 110-1 with first spectral photoresponse, and first microlens 115-1. The first color filter 110-1 is optically aligned with and disposed between the first photodiode 105-1 and the first microlens 115-1. Laterally adjacent to first pixel Q1 is third pixel Q3, which is a panchromatic pixel and includes photodiode 105-3 disposed in portion 101-3 of semiconductor material 101, third color filter 110-3 with third spectral photoresponse, and third microlens 115-3. The third color filter 110-3 is optically aligned with and disposed between the third photodiode 105-3 and the third microlens 115-3. The photodiode (e.g., 105-1) of the given pixel (e.g., Q1) corresponds to one or more doped regions within a respective portion (e.g., 101-1) of the semiconductor material 101 that are collectively responsive to incident light (e.g., one or more doped regions forming a PN junction that generates electrical or image charge proportional to a magnitude or intensity of the incident light). The color filter (e.g., 110-1) of the given pixel may restrict the incident light to one or more frequency ranges within the electromagnetic spectrum based on the spectral photoresponse of the color filter. The microlens (e.g., 115-1) of the given pixel focuses the incident light on the photodiode (e.g., 105-1) of the given pixel.

In the illustrated embodiment, each of the respective portions of semiconductor material 101 (e.g., 101-1, 101-2, . . . , 101-A, etc.) include a respective one of the plurality of photodiodes 105 such that the respective portions of semiconductor material 101 each have a first lateral area that is greater than the lateral area of a corresponding one of the individual photodiodes included in the plurality of photodiodes 105. For example, photodiode 105-1 is formed within respective portion 101-1 of semiconductor material 101, but notably does not laterally extend across the entirety of the respective portion 101-1. Thus, it is appreciated that individual photodiodes included in the plurality of photodiodes 105 do not necessarily extend laterally across the entire cross-sectional area of the respective portions of semiconductor material 101. Rather, portions of semiconductor material 101 disposed between adjacent photodiodes (e.g., region of semiconductor material 101 between photodiodes 105-1 and 105-3) may be utilized to form additional structures within the semiconductor material (e.g., isolation trenches, floating diffusion, and the like). In other embodiments, the respective portions of the semiconductor material 101 and the associated first lateral area corresponds to a largest lateral area of individual photodiodes included in the plurality of photodiodes 105. In other words, in some embodiments the first lateral area corresponds to an area of an individual photodiode included in the plurality of photodiodes 105.

As illustrated in FIG. 1B, there is a one-to-one correspondence between the plurality of photodiodes 105, the plurality of color filters 110, and the plurality of microlenses 115. In other words, there is exactly one photodiode, one color filter, and one microlens optically aligned with each other to form a given pixel. However, it is appreciated that in other embodiments there may be a different ratio between photodiodes, color filters, and microlenses of the image sensor 100.

FIG. 1C illustrates a cross-sectional view 100-BB' of the image sensor 100 illustrated in FIG. 1A along line B-B', in accordance with the teachings of the present disclosure. As illustrated, the plurality of color filters 110 are disposed between the plurality of photodiodes disposed in respective portions of semiconductor material 101 (e.g., silicon) and the plurality of microlenses 115 for a given pixel. For example, fourth pixel Q4 is a panchromatic pixel and includes photodiode 105-4 disposed in portion 101-4 of semiconductor material 101, fourth color filter 110-4 with fourth spectral photoresponse (e.g., which is equivalent to the third spectral photoresponse as illustrated), and fourth microlens 115-4. The fourth color filter 110-4 is optically aligned with and disposed between the fourth photodiode 105-4 and the fourth microlens 115-4. Laterally adjacent to fourth pixel Q4 is second pixel Q2, which is a yellow pixel and includes photodiode 105-2 disposed in portion 101-2 of semiconductor material 101, second color filter 110-2 with second spectral photoresponse, and second microlens 115-2. The second color filter 110-2 is optically aligned with and disposed between the second photodiode 105-2 and the second microlens 115-2.

Accordingly, in the embodiment illustrated by FIG. 1A, FIG. 1B, and FIG. 1C, the plurality of photodiodes 105 optically aligned with the first color filter, the second color filter, and the third color filter respectively form red pixels (e.g., first pixel Q1), yellow pixels (e.g., second pixel Q2 illustrated in FIG. 1C), and panchromatic pixels (e.g., third pixel Q3 illustrated in FIG. 1B and fourth pixel Q4 illustrated in FIG. 1C) based, at least in part, on the first spectral photoresponse, the second spectral photoresponse, and the third spectral photoresponse (see, e.g., hatch pattern of color filters illustrated in FIG. 1A, FIG. 1B, and FIG. 1C).

Each of the pixels includes one or more microlenses that may be formed of a polymer (e.g., polymethylmethacrylate, polydimethylsiloxane, etc.) or other material and be shaped to have optical power for converging, diverging, or otherwise directing light incident upon the plurality of microlenses 115 (e.g., 115-1) through a corresponding optically aligned one (e.g., 110-1) of the plurality of color filters 110 to a respective one or more (e.g., 105-1) photodiodes included in the plurality of photodiodes 105. In some embodiments there is a one-to-one ratio between the number of color filters included in the plurality of color filters 110 and the number of photodiodes included in the plurality of photodiodes 105 and/or the number of microlenses included in the plurality of microlenses 115. In other embodiments there may be more photodiodes and/or microlenses relative to the number of color filters (e.g., the lateral area defining an individual color filter is greater than lateral area defining an individual photodiode and/or microlens). In one embodiment, the ratio of color filters to photodiodes and/or microlenses may be one-to-two, one-to-three, one-to-four, or otherwise.

It is appreciated that image sensor 100 may be fabricated by semiconductor device processing and microfabrication techniques known by one of ordinary skill in the art. In one embodiment, fabrication of image sensor 100 may include providing a semiconductor material (e.g., a silicon wafer having a front side and a back side), forming a mask or template (e.g., out of cured photoresist) on the front side of the semiconductor material 101 via photolithography to provide a plurality of exposed regions of the front side of semiconductor material 101, doping (e.g., via ion implantation, chemical vapor deposition, physical vapor deposition, and the like) the exposed portions of the semiconductor material 101 to form the plurality of photodiodes 105 that extend into semiconductor material 101 from the front side of semiconductor material 101, removing the mask or template (e.g., by dissolving the cured photoresist with a solvent), and planarizing (e.g., via chemical mechanical planarization or polishing) the front side of semiconductor material 101. In the same or another embodiment, photolithography may be similarly used to form the plurality of color filters 110 (e.g., cured pigmented polymers having a desired spectral photoresponse) and the plurality of microlenses 115 (e.g., polymer based microlenses having a target shape and size formed from a master mold or template). It is appreciated that the described techniques are merely demonstrative and not exhaustive and that other techniques may be utilized to fabricate one or more components of image sensor 100.

Figure 2A:
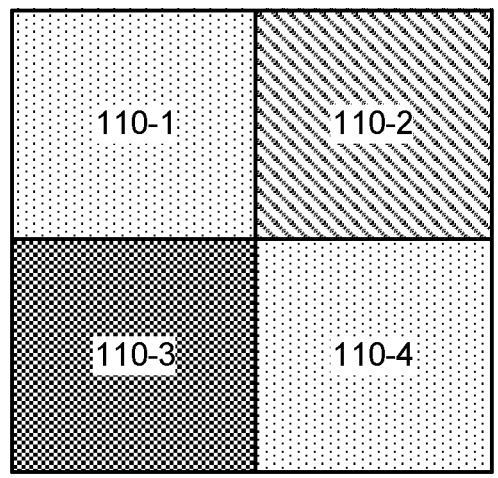
FIG. 2A, FIG. 2B, and FIG. 2C illustrate example two-by-two subtractive color filter patterns, in accordance with the teachings of the present disclosure.
Figure 2B:
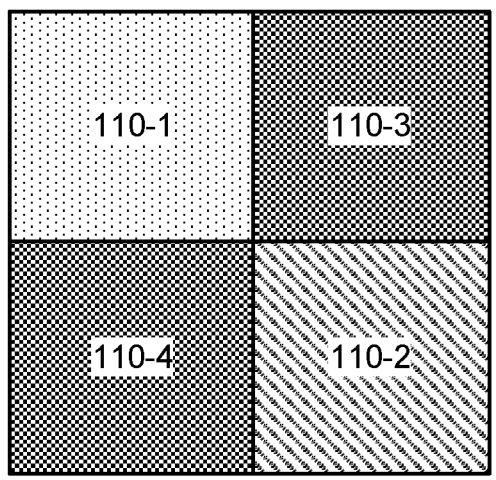
Figure 2C:
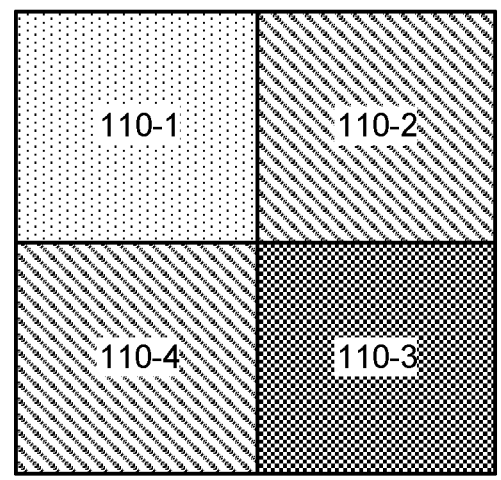

FIG. 2A, FIG. 2B, and FIG. 2C illustrate example two-by-two subtractive color filter patterns 210, 230, and 250, in accordance with the teachings of the present disclosure. The subtractive color filter patterns 210, 230, and 250 are a group of four abutting color filters (e.g., first color filter 110-1, second color filter 110-2, third color filter 110-3, and fourth color filter 110-4) that collectively form a two-by-two color filter pattern of a minimal repeating unit (e.g., minimal repeating unit 120 of FIG. 1A). In the illustrated embodiments of FIG. 2A, FIG. 2B, and FIG. 2C, the first color filter 110-1 has a red spectral photoresponse, the second color filter 110-2 has a yellow spectral photoresponse and the third color filter 110-3 has a panchromatic spectral photoresponse. It is appreciated that the subtractive color filter patterns 210, 230, and 250 are possible implementations of a color filter arrangement for image sensor 100 illustrated in FIG. 1A, FIG. 1B, and FIG. 1C.

FIG. 2A illustrates subtractive color filter pattern 210 of a minimal repeating unit, which includes first color filter 110-1 disposed adjacent to second color filter 110-2, adjacent to third color filter 110-3, and diagonally across from fourth color filter 110-4. As illustrated, the fourth color filter 110-4 has a spectral photoresponse substantially equal to the red spectral photoresponse of the first color filter 110-1.

FIG. 2B illustrates subtractive color filter pattern 230 of a minimal repeating unit, which includes first color filter 110-1 disposed adjacent to the third color filter 110-3, adjacent to the fourth color filter 110-4, and diagonally across from the second color filter 110-2. As illustrated, the fourth color filter has a spectral photoresponse substantially equal to the panchromatic spectral photoresponse of the third color filter 110-3.

FIG. 2C illustrates subtractive color filter pattern 250 of a minimal repeating unit, which includes first color filter 110-1 disposed adjacent to the second color filter 110-2, adjacent to the fourth color filter 110-4, and diagonally across from the third color filter 110-3. As illustrated, the fourth color filter 110-4 has a spectral photoresponse substantially equal to the yellow spectral photoresponse of the second color filter 110-2.

Figure 3A:
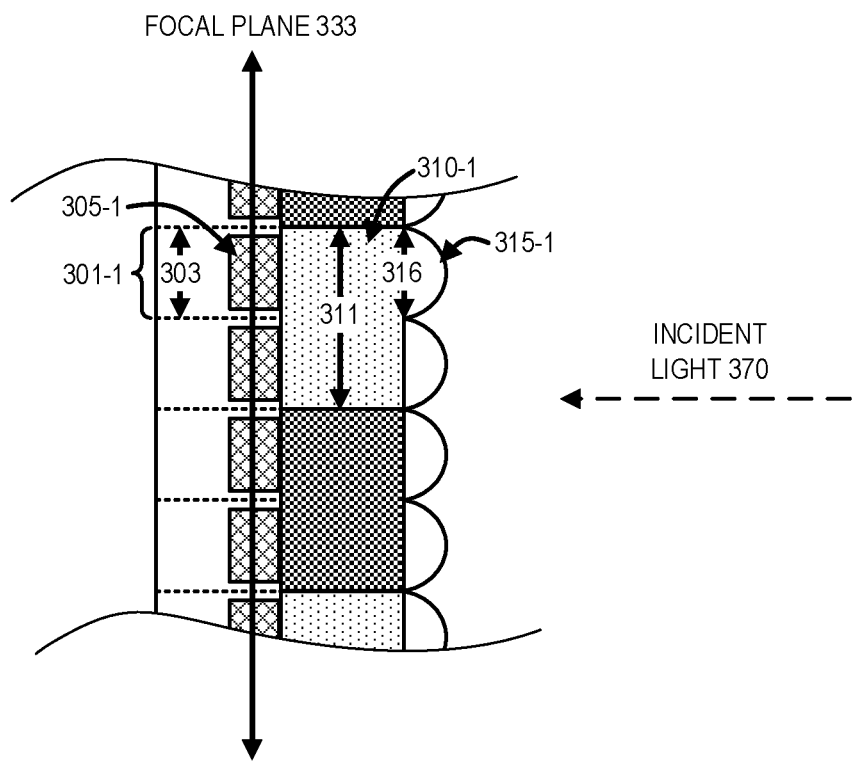
FIG. 3A illustrates a cross-sectional view of an image sensor with subtractive color filter pattern relative to a focal plane of the image sensor, in accordance with the teachings of the present disclosure.

FIG. 3A illustrates a cross-sectional view of an image sensor 300 with subtractive color filter pattern relative to a focal plane 333 of the image sensor 300, in accordance with the teachings of the present disclosure. Image sensor 300 is one possible implementation of image sensor 100 illustrated in FIG. 1A, FIG. 1B, and FIG. 1C and may include like labeled features, components, or otherwise. More specifically, image sensor 300 differs from image sensor 100 based, at least in part, on the dimensional relationship between elements. For example, image sensor 300 has a one-to-four ratio between the number of the plurality of color filters 310 and the number of the plurality of photodiodes 305, which differs from the one-to-one ratio of image sensor 100 of FIG. 1A. It is further noted that image sensor 300 of FIG. 3 has a four-to-one ratio between the number of the plurality of color filters 310 and the number of the plurality of microlenses 315.

In the illustrated embodiment of FIG. 3A, an exemplary relationship between lateral area 303 of respective portions of semiconductor material 301, lateral area 311 of the plurality of color filters 310, and lateral area 316 of the plurality of microlenses 315 with respect to the focal plane 333 of the image sensor 300 is shown. As illustrated, the lateral areas 303, 311, and 316 are taken along respective cross-sectional planes of the photodiode array (e.g., formed by the plurality of photodiodes 305 within respective portions of semiconductor material 301), the color filter array (e.g., formed by the plurality of color filters 310), and the microlens array (e.g., formed by the plurality of microlenses 315) that are each substantially parallel with the focal plane 333 (e.g., where incident light 370 is focused upon due, at least in part, to the shape of the plurality of microlenses 315) of image sensor 300. It is appreciated that in some embodiments the lateral area 303, the lateral area 311, and the lateral area 316 are each taken a long a largest cross-section of an optically aligned one of the respective semiconductor portions 301, the plurality of color filters 310, of the plurality of microlenses 315 that is substantially parallel with the focal plane 333 of image sensor 300.

Figure 3B:
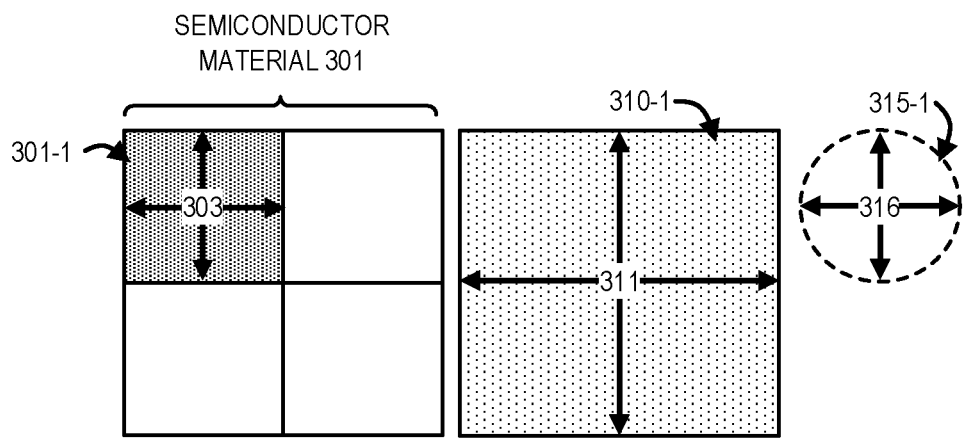
FIG. 3B illustrates a relative size comparison between lateral areas of a respective portion of a semiconductor material, a color filter, and a microlens included in the image sensor with subtractive color filter pattern of FIG. 3A, in accordance with the teachings of the present disclosure.

FIG. 3B illustrates a relative size comparison between lateral areas of a respective portion 301-1 of a semiconductor material 301, a color filter 310-1, and a microlens 315-1 included in the image sensor 300 with subtractive color filter pattern of FIG. 3A, in accordance with the teachings of the present disclosure. In the illustrated embodiment, each of the respective portions (e.g., 301-1) of semiconductor material 301 have lateral area 303. Each of the plurality of color filters 310 (e.g., 310-1) have lateral area 311 greater than the lateral area 303 of each of the plurality of photodiodes 305.

Each of the plurality of microlenses 315 (e.g., 315-1) have a lateral area 316 less than the lateral area 303 and the lateral area 311. In some embodiments, a minimal repeating unit of image sensor 300 may include a first color filter, a second color filter, and a third color filter included in the plurality of color filters 310 that each have a lateral area 311 at least four times greater than a lateral area 303 of an individual photodiode included in the plurality of photodiodes 305 and/or a lateral area 316 of an individual microlens included in the plurality microlenses 316.

Figure 4:
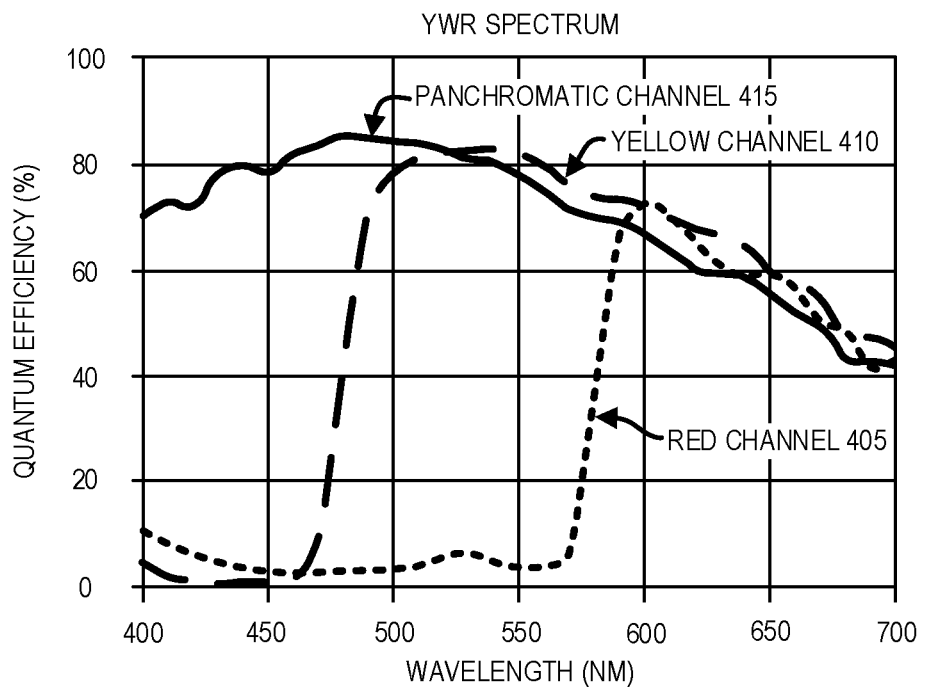
FIG. 4 illustrates an example chart of quantum efficiency with respect to wavelength for an image sensor with a subtractive color filter pattern and corresponding conversion to RGB spectrum, in accordance with the teachings of the present disclosure.
Figure 4:
Figure 4:
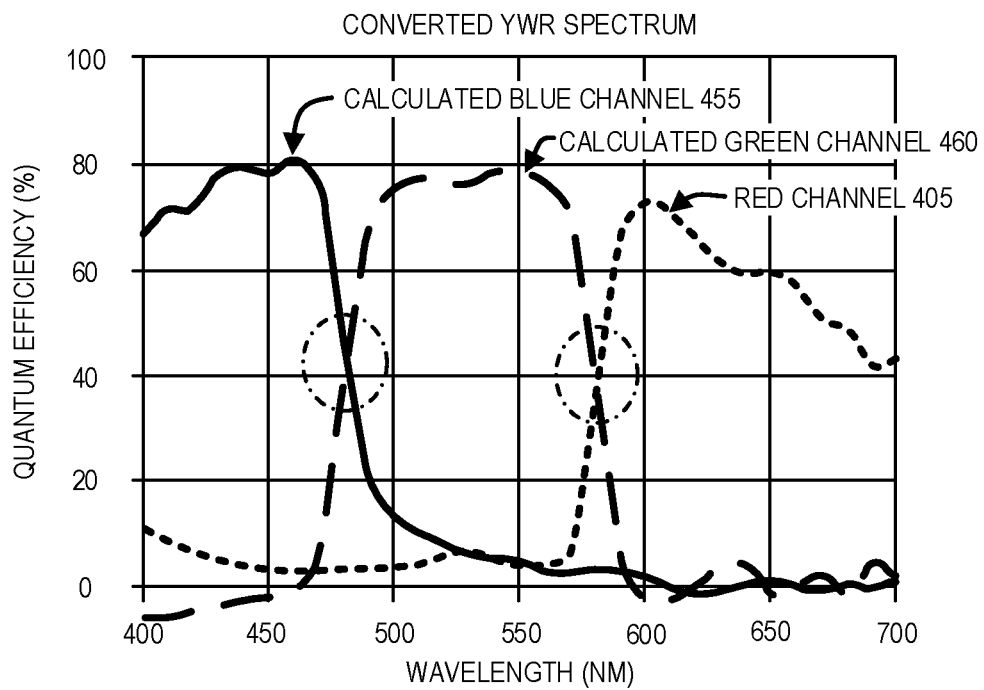

FIG. 4 illustrates an example chart 400 of quantum efficiency with respect to wavelength for an image sensor with a subtractive color filter pattern and corresponding conversion to RGB spectrum in chart 450, in accordance with the teachings of the present disclosure. More specifically, chart 400 illustrates example quantum efficiency of a red pixel with a red spectral photoresponse (e.g., pixel Q1 of FIG. 1A), a yellow pixel with a yellow spectral photoresponse (e.g., pixel Q2 of FIG. 1A), and a panchromatic pixel with a panchromatic spectral photoresponse (e.g., pixel Q3 and/or Q4 of FIG. 1A), which may respectively correspond to a red channel 405, yellow channel 410, and a panchromatic channel 415 of a minimal repeating unit (e.g., full color image pixel) of an image sensor (e.g., image sensor 100 illustrated in FIG. 1A-1C, image sensor 300 illustrated in FIG. 3A, or any other embodiment of the disclosure).

As illustrated the quantum efficiency is greater than 40% between a first frequency range of 570 nm to 700 nm for the red pixels (e.g., red channel 405), greater than 40% between a second frequency range of 450 nm to 700 nm for the yellow pixels (e.g., yellow channel 410), and greater than 40% between a third frequency range between 400 nm to 700 nm for the panchromatic pixels (e.g., panchromatic channel 415). It is further noted that a maximum rate of rise of quantum efficiency for the red pixels (e.g., red channel 405) and the yellow pixels (e.g., yellow channel 410) increases within a visible spectrum frequency range (e.g., between 400 nm and 700 nm) is greater than 3% per nm, which is illustrated by the steep slope upon onset of the red channel 405 and the yellow channel 410. Advantageously, the steep slope upon onset enables lower cross talk between converted channels as illustrated in chart 450.

Chart 450 illustrated a converted YWR spectrum to calculate quantum efficiency with respect to wavelength for calculated blue channel 455, calculated green channel 460, and red channel 405. In other words, chart 450 demonstrates expected quantum efficiency performance of an image sensor with a subtractive color filter pattern, in accordance with embodiments of the present disclosure. The calculated blue channel 455 is determined by subtracting the yellow channel 410 from the panchromatic channel 415. The calculated green channel 460 is determined by subtracting the red channel 405 from the yellow channel 410.

Figure 5:
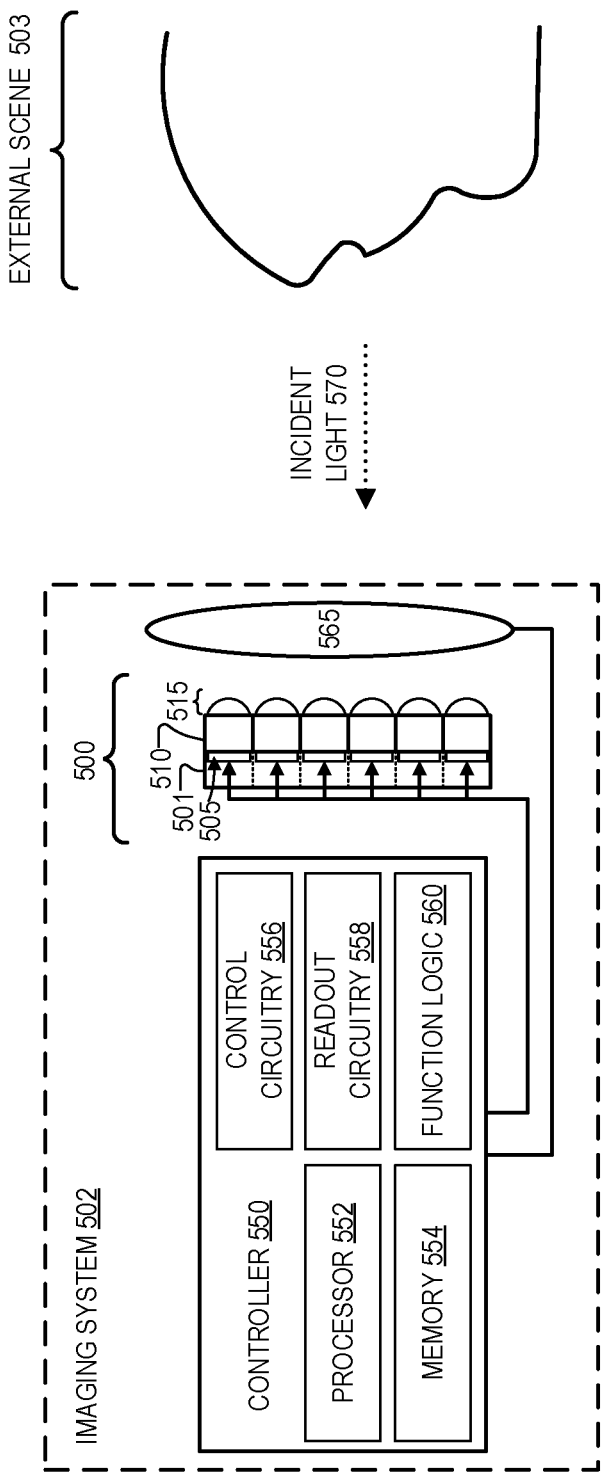
FIG. 5 is a functional block diagram of an imaging system including an image sensor with subtractive color filter pattern, in accordance with the teachings of the present disclosure.

FIG. 5 is a functional block diagram of an imaging system 502 including an image sensor 500 with subtractive color filter pattern, in accordance with the teachings of the present disclosure. The imaging system 502 includes image sensor 500 to generate electrical or image signals in response to incident light 570, objective lens(es) 565 with adjustable optical power to focus on one or more points of interest within the external scene 503, and controller 550 to control, inter alia, operation of image sensor 500 and objective lens(es) 520. Image sensor 500 is one possible implementation of image sensor 100 illustrated in FIGS. 1A-1C and image sensor 300 illustrated in FIG. 3A. Image sensor 500 includes a semiconductor material 501 with a plurality of photodiodes 505 disposed within respective portions of the semiconductor material 501, a plurality of color filters 510, and a plurality of microlenses 515. The controller 550 includes one or more processors 552, memory 554, control circuitry 556, readout circuitry 558, and function logic 560.

The controller 550 includes logic and/or circuitry to control the operation (e.g., during pre-, post-, and in situ phases of image and/or video acquisition) of the various components of imaging system 502. The controller 550 may be implemented as hardware logic (e.g., application specific integrated circuits, field programmable gate arrays, system-on-chip, etc.), software/firmware logic executed on a general purpose microcontroller or microprocessor, or a combination of both hardware and software/firmware logic. In one embodiment, the controller 550 includes the processor 552 coupled to memory 554 that stores instructions for execution by the controller 550 and/or one or more other components of the imaging system 502. The instructions, when executed, may cause the imaging system 502 to perform operations associated with the various functional modules, logic blocks, or circuitry of the imaging system 502 including any one of, or a combination of, the control circuitry 556, the readout circuitry 558, the function logic 560, image sensor 500, objective lens 565, and any other element of imaging system 502 (illustrated or otherwise). The memory is a non-transitory computer-readable medium that may include, without limitation, a volatile (e.g., RAM) or non-volatile (e.g., ROM) storage system readable by controller 550. It is further appreciated that the controller 550 may be a monolithic integrated circuit, one or more discrete interconnected electrical components, or a combination thereof. Additionally, in some embodiments one or more electrical components may be coupled together to collectively function as controller 550 for orchestrating operation of the imaging system 502.

Control circuitry 556 may control operational characteristics of the photodiode array 505 (e.g., exposure duration, when to capture digital images or videos, and the like). Readout circuitry 558 reads or otherwise samples the analog signal from the individual photodiodes (e.g., read out electrical signals generated by each of the plurality of photodiodes 505 in response to incident light to generate image signals for capturing an image frame, and the like) and may include amplification circuitry, analog-to-digital (ADC) circuitry, image buffers, or otherwise. In the illustrated embodiment, readout circuitry 558 is included in controller 550, but in other embodiments readout circuitry 558 may be separate from the controller 550. Function logic 560 is coupled to the readout circuitry 558 to receive image data within a YWR color spectrum (e.g., based on electrical signals generated in response to incident light) and convert image data to an RGB color spectrum (e.g., for demosaicing the image data to generate one or more image frames). In some embodiments, the electrical signals and/or image data may be manipulated or otherwise processed by the function logic 560 (e.g., apply post image effects such as crop, rotate, remove red eye, adjust brightness, adjust contrast, or otherwise).

Figure 6:
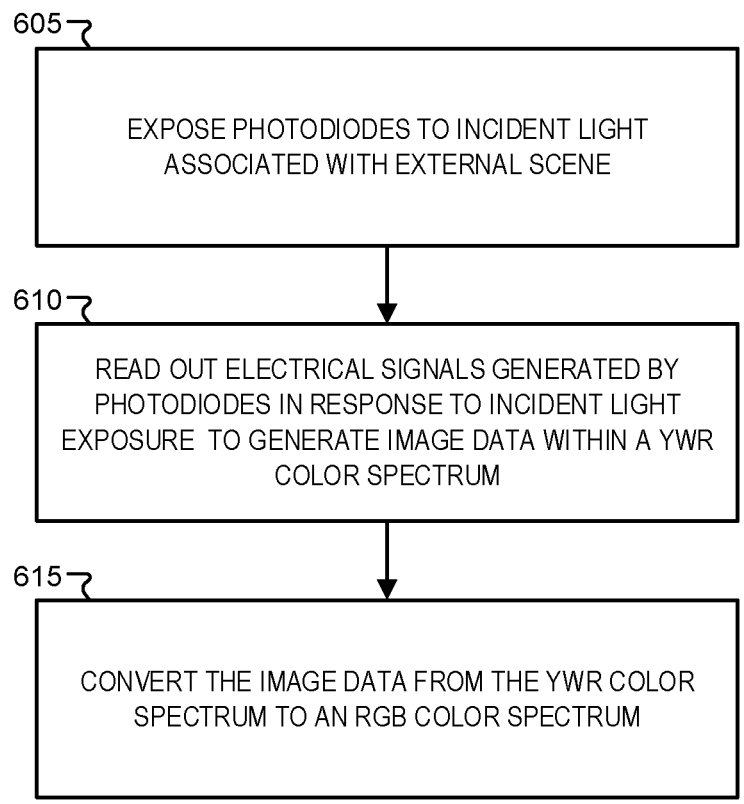
FIG. 6 illustrates an example conversion process for demosaicing image signals obtained from an image sensor with a subtractive color filter pattern, in accordance with the teachings of the present disclosure.

FIG. 6 shows an example process or method 600 for capturing an image with an imaging system including an image sensor with a subtractive color filter pattern, in accordance with the teachings of the present disclosure. In some embodiments method 600 may be implemented by imaging system 502 illustrated in FIG. 5 and/or any of image sensor 100 illustrated in FIGS. 1A-1C or image sensor 300 illustrated in FIG. 3A. It is appreciated that the numbered blocks of method 600, including blocks 605-615, may occur in any order and even in parallel. Additionally, blocks may be added to, or removed from, method 600 in accordance with the teachings of the present disclosure.

Block 605 illustrates exposing a plurality of photodiodes to incident light associated with an external scene. In response to the incident light the plurality of photodiodes generates electrical signals proportional to the intensity of the incident light.

Block 610 shows reading out electrical signals (e.g., via readout circuitry 558 illustrated in FIG. 5) in response to the incident light. Electrical signals may be read out individually from respective pixels (e.g., by transferring the image charge generated in each of the photodiodes as an electrical signal one row at a time to column storage capacitors, and then reading out the elements individually using a column decoder coupled to a multiplexer) in response to the incident light. In some embodiments, upon readout, the electrical signals may be converted to digital signals (e.g., by one or more analog-to-digital converters included in the readout circuitry or otherwise included in the image system) to generate image data in a YWR color spectrum (e.g., due to a subtractive color filter pattern of the image sensor that includes red, yellow, and panchromatic color filters).

Block 615 illustrates converting the image data from the YWR color spectrum to an RGB color spectrum. This is achieved, for example, by subtracting image data associated with yellow pixels from image data associated with panchromatic or white pixels to generate blue channel information. Similarly, green channel information may be calculated by subtracting image data associated with red pixels from image data associated with yellow pixels. In some embodiments, the RGB color spectrum conversion may be accomplished based, at least in part, on the location of individual pixels within the image sensor. For example, a yellow pixel may have four nearest neighbors corresponding to white pixels (see, e.g., FIG. 1A). The image data associated with the yellow pixel may be converted to green channel information by averaging the image data associated with the four nearest neighbors and then taking the average and subtracting the image data associated with the yellow pixel. This process may be repeated until the image data associated with yellow and panchromatic pixels is converted to image data representative of green and blue channel information. Upon conversion, the image data in the RGB spectrum may be representative of a standard Bayer pattern, which may then be utilized for further processing to generate one or more images of an external scene.

The processes explained above may be implemented using software and/or hardware. The techniques described may constitute machine-executable instructions embodied within a tangible or non-transitory machine (e.g., computer) readable storage medium, that when executed by a machine (e.g., controller 120 of FIG. 1A) will cause the machine to perform the operations described. Additionally, the processes may be embodied within hardware, such as an application specific integrated circuit ("ASIC"), field programmable gate array (FPGA), or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An image sensor, comprising
a photodiode array including a plurality of photodiodes disposed within respective portions of a semiconductor material;
a color filter array optically aligned with the photodiode array, wherein the color filter array includes a plurality of color filters arranged to form a plurality of tiled minimal repeating units, each minimal repeating unit including at least:
a first color filter with a red spectral photoresponse, a second color filter with a yellow spectral photoresponse, and a third color filter with a panchromatic spectral photoresponse.

2. The image sensor of claim 1, wherein the minimal repeating unit includes a group of four abutting color filters including the first color filter, the second color filter, the third color filter, and a fourth color filter that collectively form a two-by-two color filter pattern.

3. The image sensor of claim 2, wherein the fourth color filter has a spectral photoresponse substantially equal to the red spectral photoresponse of the first color filter, the yellow spectral photoresponse of the second color filter, or the panchromatic spectral photoresponse of the third color filter.

4. The image sensor of claim 2, wherein the minimal repeating unit includes the first color filter disposed adjacent to the second color filter, adjacent to the third color filter, and diagonally across from the fourth color filter, and wherein the fourth color filter has a spectral photoresponse substantially equal to the red spectral photoresponse of the first color filter.

5. The image sensor of claim 2, wherein the minimal repeating unit includes the first color filter disposed adjacent to the third color filter, adjacent to the fourth color filter, and diagonally across from the second color filter, and wherein the fourth color filter has a spectral photoresponse substantially equal to the panchromatic spectral photoresponse of the third color filter.

6. The image sensor of claim 2, wherein the minimal repeating unit includes the first color filter disposed adjacent to the second color filter, adjacent to the fourth color filter, and diagonally across from the third color filter, and wherein the fourth color filter has a spectral photoresponse substantially equal to the yellow spectral photoresponse of the second color filter.

7. The image sensor of claim 1, further comprising:
a microlens array including a plurality of microlenses optically aligned with the photodiode array and the color filter array, wherein the first color filter, the second color filter, and the third color filter of the minimal repeating unit each have a first lateral area at least four times greater than a second lateral area of an individual photodiode included in the plurality of photodiodes or an individual microlens included in the plurality of microlenses.

8. The image sensor of claim 1, wherein the plurality of photodiodes optically aligned with the first color filter, the second color filter, and the third color filter respectively form red pixels, yellow pixels, and panchromatic pixels based, at least in part, on the first spectral photoresponse, the second spectral photoresponse, and the third spectral photoresponse.

9. The image sensor of claim 8, wherein quantum efficiency is greater than 40% between a first frequency range of 570 nm to 700 nm for the red pixels, greater than 40% between a second frequency range of 450 nm to 700 nm for the yellow pixels, and greater than 40% between a third frequency range between 400 nm to 700 nm for the panchromatic pixels.

10. The image sensor of claim 8, wherein a maximum rate of rise of quantum efficiency for the red pixels and the yellow pixels increases within a visible spectrum frequency range is greater than 3% per nm.

11. The image sensor of claim 1, further comprising:
a controller coupled to the photodiode array and memory, including instructions, that when executed by the controller cause the image sensor to perform operations including:
reading out electrical signals generated in response to light incident upon the photodiode array to generate image data within a YWR color spectrum; and
converting the image data from the YWR color spectrum to an RGB color spectrum.

12. An image sensor pixel, comprising:
a first photodiode, a second photodiode, and a third photodiode, each disposed within respective portions of a semiconductor material;
a first color filter, a second color filter, and a third color filter optically aligned with the first photodiode, the second photodiode, and the third photodiode, respectively, wherein the first color filter has a first spectral photoresponse, the second color filter has a second spectral photoresponse, and the third color filter has a third spectral photoresponse, wherein the third spectral photoresponse is broader than the first spectral photoresponse and the second spectral photoresponse, and wherein the second spectral photoresponse is broader than the first spectral photoresponse;
a fourth photodiode disposed within the semiconductor material; and
a fourth color filter with a fourth spectral photoresponse substantially equal to the second spectral photoresponse, wherein the first color filter is disposed adjacent to the second color filter, adjacent to the fourth color filter, and diagonally across from the third color filter.

13. The image sensor pixel of claim 12, wherein the first spectral photoresponse corresponds to a red spectral photoresponse, the second spectral photoresponse corresponds to a yellow spectral photoresponse, and the third spectral photoresponse corresponds to a panchromatic spectral photoresponse.

14. The image sensor pixel of claim 13, wherein the first photodiode and the first color filter form a red pixel, wherein the second photodiode and the second color filter form a yellow pixel, and the third photodiode and the third color filter form a white pixel, wherein the red pixel, the yellow pixel, and the panchromatic pixel collectively form, at least in part, the image sensor pixel.

15. The image sensor pixel of claim 14, wherein quantum efficiency is greater than 40% between a first frequency range of 570 nm to 700 nm for the red pixel, greater than 40% between a second frequency range of 450 nm to 700 nm for the yellow pixel, and greater than 40% between a third frequency range between 400 nm to 700 nm for the panchromatic pixel.

16. The image sensor pixel of claim 14, wherein a maximum rate of rise of quantum efficiency for the red pixels and the yellow pixels increases within a visible spectrum frequency range is greater than 3% per nm.

17. The image sensor pixel of claim 12, wherein the first color filter is disposed adjacent to the second color filter, adjacent to the third color filter, and diagonally across from the fourth color filter, and wherein the fourth spectral photoresponse is substantially equal to the first spectral photoresponse.

18. The image sensor pixel of claim 12, wherein the first color filter is disposed adjacent to the third color filter, adjacent to the fourth color filter, and diagonally across from the second color filter, and wherein the fourth spectral photoresponse is substantially equal to the third spectral photoresponse.

19. An image sensor pixel, comprising:
a first photodiode, a second photodiode, and a third photodiode, each disposed within respective portions of a semiconductor material; and
a first color filter, a second color filter, and a third color filter optically aligned with the first photodiode, the second photodiode, and the third photodiode, respectively, wherein the first color filter has a first spectral photoresponse, the second color filter has a second spectral photoresponse, and the third color filter has a third spectral photoresponse, wherein the third spectral photoresponse is broader than the first spectral photoresponse and the second spectral photoresponse, and wherein the second spectral photoresponse is broader than the first spectral photoresponse, wherein the first spectral photoresponse corresponds to a red spectral photoresponse, the second spectral photoresponse corresponds to a yellow spectral photoresponse, and the third spectral photoresponse corresponds to a panchromatic spectral photoresponse.

* * * * *